3,370,088
SEPARATION OF BENZOPHENONE 2,4'- AND 4,4'-DICARBOXYLIC ACIDS
Henri K. Lese, Oakmont, John H. McCracken, Pitcairn, and Johann G. D. Schulz, Pittsburgh, Pa., assignors to Gulf Research & Development Company, Pittsburgh, Pa., a corporation of Delaware
No Drawing. Filed June 19, 1964, Ser. No. 376,586
8 Claims. (Cl. 260—517)

ABSTRACT OF THE DISCLOSURE

A process for separating benzophenone 2,4'-dicarboxylic acid from a mixture containing the same and benzophene 4,4'-dicarboxylic acid which involves treating the mixture with a mixture of a lower alkyl alcohol and a di-lower alkyl ketone or a diether.

---

This invention relates to a process for separating benzophenone 2,4'-dicarboxylic acid from a mixture containing the same and benzophenone 4,4'-dicarboxylic acid.

When ditolylethane is prepared in accordance with known procedures the mixture obtained will contain from about 50 to about 90 percent by weight of the symmetrical isomer 1,1-di (p-tolyl) ethane and from about 10 to about 50 percent by weight of the unsymmetrical isomer 1-(o-tolyl), 1-(p-tolyl) ethane. Even when ditolylethane is prepared by condensing one mol of acetaldehyde with two moles of toluene in the manner set forth in U.S. Patent No. 3,002,034 of Schulz, a mixture containing about 80 to about 90 percent by weight of 1,1-di (p-tolyl) ethane and about 10 to about 20 percent by weight of 1-(o-tolyl), 1-(p-tolyl) ethane is obtained. It is practically impossible economically to separate these isomers from each other, since their boiling points are so close to each other.

Ditolylethane can be converted to the corresponding acid by subjecting the same to oxidation conditions in any suitable manner, for example, by following the conditions set forth in U.S. Patent No. 3,075,007 of McCracken et al. Unfortunately, as a result of such oxidation the two ditolylethane isomers defined above, 1,1-di (p-tolyl) ethane and 1-(o-tolyl), 1-(p-tolyl) ethane, are converted to the acids, benzophenone 4,4'-dicarboxylic acid and benzophenone 2,4'-dicarboxylic acid, respectively.

For many commercial purposes a mixture of the two diacid isomers defined above is not desired. For example, benzophenone 4,4'-dicarboxylic acid can be employed as a starting material for the preparation of linear polyester fibers. The presence of the unsymmetrical isomer, benzophenone 2,4'-dicarboxylic acid, would be detrimental in the preparation of such linear polymers and, accordingly, must be separated from admixture with benzophenone 4,4'-dicarboxylic acid.

We have found that benzophenone 2,4'-dicarboxylic acid can effectively be removed from a mixture containing the same and benzophenone 4,4'-dicarboxylic acid by a procedure which involves treating such mixture with a mixture containing a selected alcohol and a selected carbonyl-containing compound.

The alcohol that can be employed for the purification procedure defined herein can be defined by the following general formula: R'OH wherein R' can be an alkyl group having from one to five carbon atoms, such as methyl, ethyl, propyl, butyl and amyl. Examples of such alcohols are methanol, ethanol, n-propanol, isopropanol, n-butanol, n-pentanol, etc. Methanol is the preferred alcohol.

The carbonyl-containing compound that can be employed herein with the alcohol defined above can be defined by the following general formula:

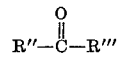

wherein R" and R'", the same or different, are selected from the group consisting of hydrogen and alkyl groups having from one to four carbon atoms, such as methyl, ethyl, propyl and butyl. Examples of such carbonyl-containing compounds are formaldehyde, acetaldehyde, n-propionaldehyde, n-butyraldehyde, acetone, diethylketone, methylethylketone, diisopropylketone, methylpropylketone, ethylpropylketone, diisobutylketone, etc. Acetone is the preferred carbonyl-containing compound.

As pointed out above, we can employ a mixture containing the defined alcohol and the defined carbonyl-containing compound to selectively remove benzophenone 2,4'-dicarboxylic acid from a mixture containing the same and benzophenone 4,4'-dicarboxylic acid. We have noted, however, that during the purification procedure defined herein and under the conditions thereof the mixture of acids being purified acts as a catalytic medium to promote the reaction of the defined alcohol with the defined carbonyl-containing compound to produce a diether. We have also found that such diethers are also effective to selectively remove benzophenone 2,4'-dicarboxylic acid from a mixture containing the same and benzophenone 4,4'-dicarboxylic acid.

The reaction which we believe takes place between the defined alcohol and the defined carbonyl-containing compound under the catalytic effect of the mixture of benzophenone dicarboxylic acids being treated can be defined as follows:

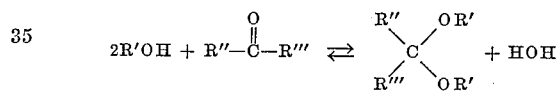

Since the reaction defined above is reversible the mixture employed will be one containing alcohol, carbonyl-containing compound, diether and water.

We have also found that instead of employing a mixture of the defined alcohol and the defined carbonyl-containing compound, the defined diether alone that would be produced as a result of the reaction defined above can be employed in the purification procedure defined herein. Examples of such diethers that can be employed herein are dimethoxymethane, diethoxymethane, 1,1-dimethoxyethane, 1,1-diethoxyethane, 1,1-dipropoxybutane, 1,1-di (tert. butoxy) methane, 2,2-dimethoxypropane, 2,2-diethoxybutane, 2,2 - dipropoxy, 4 - methylhexane, 3,3-dipentoxypentane, etc. We prefer to employ 2,2-dimethoxypropane.

We have also found that while the alcohol defined above or the carbonyl-containing compound defined above alone will remove some of the benzophenone 2,4'-dicarboxylic acid from the mixture to be purified that an equivalent amount of a mixture of the alcohol and the carbonyl-containing compound will remove a larger amount of benzophenone 2,4'-dicarboxylic acid from said mixture than the alcohol or carbonyl-containing compound alone. In addition when a mixture of benzophenone 2,4'-dicarboxylic acid and benzophenone 4,4'-dicarboxylic acid that has been obtained as a result of the nitric acid oxidation of a mixture of the defined symmetrical and unsymmetrical isomers of ditolylethane is treated with a mixture of alcohol and carbonyl-containing compound, the benzophenone 4,4'-dicarboxylic acid recovered has an improved color over that of the charge mixture or even over the product obtained when either the alcohol or the carbonyl-containing compound alone is employed for the defined purification. When the defined diether alone is employed the color of the recovered acid is even improved over that obtained when the mixture of alcohol and carbonyl-containing compound is employed. The color bodies so removed are not believed to be either of the two benzophenone carboxylic acids defined herein but organic compounds containing nitrogen.

The treatment defined herein involves merely bringing the mixture of benzophenone dicarboxylic acids in contact with the mixture of alcohol and carbonyl-containing compound or the defined diether. The alcohol and carbonyl-containing compound employed can be present in the treating mixture over a wide range, for example, in a molar ratio of about 10:1 to about 1:10, but since, as noted, it is believed the alcohol and the carbonyl-containing compound react herein to form a diether, we prefer to employ the same in approximately stoichiometric amounts, that is, about two mols of alcohol to about one mol of the carbonyl-containing compound. The amounts of alcohol and carbonyl-containing compound or of diether that can be employed herein can vary over a wide range. Thus, the mixture of alcohol and carbonyl-containing compound or of diether employed can be at least twice the weight of the mixture of benzophenone dicarboxylic acids being treated, but generally will be about five to about 10 times the weight thereof.

The reaction conditions required are not critical. Thus, the temperature employed can be from about 40° to about 300° C., preferably from about 100° to about 200° C. Pressure is not critical and can therefore be from about atmospheric to about 1000 pounds per square inch gauge, or even higher. Preferably the pressure is maintained at about the autogenous pressure of the reaction mixture, which can be, for example, from about atmospheric to about 500 pounds per square inch gauge. The duration of the treatment is similarly not critical, and, for example, can be from about one minute to about 10 hours, preferably from about 30 minutes to about one hour.

As a result of the treatment defined herein we believe substantially all of the benzophenone 2,4'-dicarboxylic acid is dissolved in the treating medium and perhaps a small amount of benzophenone 4,4'-dicarboxylic acid is also dissolved therein. The bulk of the latter acid, however, is insoluble in the treating medium. At the end of the treatment the solid benzophenone 4,4'-dicarboxylic acid is separated from the treating medium containing the dissolved benzophenone 2,4'-dicarboxylic acid in any convenient fashion, for example, by filtration or decantation. The solid benzophenone 4,4'-dicarboxylic acid left behind can be washed, if desired, for example, using methanol or acetone.

The procedure of this invention can further be understood by reference to the following. The benzophenone dicarboxylic acid mixture that was subjected to treatment herein was obtained as follows. There was pumped into an autoclave 522.5 grams of ditolyethane and 1500 grams of water, and the mixture was then heated to 140° to 150° C. Over a period of 1.5 hours and while maintaining the contents of the autoclave at the defined temperature there was pumped therein 2075 grams of nitric acid having a concentration of 70 percent. The contents of the autoclave were then raised to 175° to 180° C. over a period of 15 minutes and maintained at the latter temperatures for a period of two hours while the pressure in the autoclave was held at 300 pounds per square inch gauge. At the end of this period, the product was filtered and dried at 150° C. There was obtained 605 grams of the mixture of benzophenone dicarboxylic acids employed herein. Examples I and II below show the results obtained when methanol and acetone, respectively, are employed to separate benzophenone 2,4'-dicarboxylic acid from a mixture containing the same and benzophenone 4,4'-dicarboxylic acid.

*Example I*

Into a one-liter stirred stainless steel autoclave there was placed a slurry of 100 grams of a mixture of crude highly yellow colored benzophenone dicarboxylic acids analyzed to consist essentially of 85 grams of benzophenone 4,4'-dicarboxylic acid and 15 grams of benzophenone 2,4'-dicarboxylic acid and 700 milliliters of methanol. The mixture was heated over a period of one hour at a temperature of 140° C. and a pressure of 140 pounds per square inch gauge. The mixture was cooled to atmospheric temperature and the pressure reduced to atmospheric pressure and then filtered to yield, after drying at 105° C. in a vacuum oven at a vacuum of 20 inches of mercury for two hours, 81.0 grams of a solid product which was analyzed by means of infrared to consist essentially of 76.65 grams of benzophenone 4,4'-dicarboxylic acid and 4.35 grams of benzophenone 2,4'-dicarboxylic acid. There was a slight improvement in the color of the product from the original mixture.

*Example II*

The run of Example I was repeated, except that 700 milliliters of acetone was employed in place of methanol. After filtration, there was obtained 86.0 grams of a mixture which analysis showed contained 82.1 grams of benzophenone 4,4'-dicarboxylic acid and 3.9 grams of benzophenone 2,4'-dicarboxylic acid. There was a slight improvement in the color of the product from the original mixture.

That a synergistic effect is obtained when a mixture of the defined alcohol and the defined carbonyl-containing compound is employed rather than either one alone is shown by the following.

*Example III*

The run of Example I was repeated except that a mixture of 560 milliliters of methanol and 140 milliliters of acetone was employed in place of methanol. The liquid in the reactor was analyzed by gas chromatography to contain 30.0 grams of 2,2-dimethoxypropane. After filtration, there was obtained 82.20 grams of a mixture which analysis showed contained 80.25 grams of benzophenone 4,4'-dicarboxylic acid and 1.95 grams of benzophenone 2,4'-dicarboxylic acid. The color of the product was improved somewhat and was only slightly yellow.

That a diether is more effective for the defined purpose than a mixture of alcohol and a carbonyl-containing compound can be seen from the following.

*Example IV*

The run of Example I was repeated except that 50 grams of the same crude benzophenone dicarboxylic acid mixture was subjected to treatment and 350 milliliters of 2,2-dimethoxypropane was employed in place of methanol. After filtration, there was obtained 40.6 grams of a mixture which analysis showed contained 40.3 grams of benzophenone 4,4'-dicarboxylic acid and 0.3 gram of benzophenone 2,4'-dicarboxylic acid. The product obtained was near white. In this run, as well as the preceding runs, the disappearance of some of the benzophenone 4,4'-dicarboxylic acid can be attributed to some apparent solubility in the treating medium as well as to handling losses.

*Example V*

That the defined diether can be obtained herein only when the reaction of the alcohol and the carbonyl-containing compounds catalyzed by the presence of the benzophenone dicarboxylic acids is apparent from the following. Into a one-liter stirred stainless steel autoclave there was placed 560 milliliters of methanol and 140 milliliters of acetone, and the mixture was heated at a temperature of 140° C. and at a pressure of 140 pounds per square inch gauge over a period of one hour. After cooling to room temperature and atmospheric pressure the mixture was analyzed by gas chromatography, but no dimethoxypropane was found.

Obviously, many modifications and variations of the invention as hereinabove set forth can be made without

We claim:
1. A process for separating benzophenone 2,4'-dicarboxylic acid from a mixture containing the same and benzophenone 4,4'-dicarboxylic acid which comprises contacting said mixture with a diether defined by the following formula:

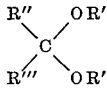

wherein R' is an alkyl group having from one to five carbon atoms and R" and R'" are selected from the group consisting of hydrogen and alkyl groups having from one to four carbon atoms and thereafter removing solid benzophenone 4,4'-dicarboxylic acid from the resulting mixture.

2. A process for separating benzophenone 2,4'-dicarboxylic acid from a mixture containing the same and benzophenone 4,4'-dicarboxylic acid, said mixture having been obtained as a result of the nitric acid oxidation of ditolylethane, which comprises contacting said mixture with a diether defined by the following formula:

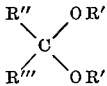

wherein R' is an alkyl group having from one to five carbon atoms and R" and R'" are selected from the group consisting of hydrogen and alkyl groups having from one to four carbon atoms and thereafter removing solid benzophenone 4,4'-dicarboxylic acid from the resulting mixture.

3. A process for separating benzophenone 2,4'-dicarboxylic acid from a mixture containing the same and benzophenone 4,4'-dicarboxylic acid which comprises contacting said mixture with a diether defined by the following formula:

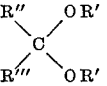

wherein R' is an alkyl group having from one to five carbon atoms and R" and R'" are selected from the group consisting of hydrogen and alkyl groups having from one to four carbon atoms at a temperature of about 40° to about 300° C. and thereafter removing solid benzophenone 4,4'-dicarboxylic acid from the resulting mixture.

4. A process for separating benzophenone 2,4'-dicarboxylic acid from a mixture containing the same and benzophenone 4,4'-dicarboxylic acid which comprises contacting said mixture with at least twice the weight thereof of a diether defined by the following formula:

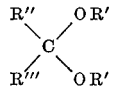

wherein R' is an alkyl group having from one to five carbon atoms and R" and R'" are selected from the group consisting of hydrogen and alkyl groups having from one to four carbon atoms at a temperature of about 40° to about 300° C. and thereafter removing solid benzophenone 4,4'-dicarboxylic acid from the resulting mixture.

5. A process for separating benzophenone 2,4'-dicarboxylic acid from a mixture containing the same and benzophenone 4,4'-dicarboxylic acid which comprises contacting said mixture with at least twice the weight thereof of 2,2-dimethoxypropane at a temperature of about 40° to about 300° C. and thereafter removing solid benzophenone 4,4'-dicarboxylic acid from the resulting mixture.

6. A process for separating benzophenone 2,4'-dicarboxylic acid from a mixture containing the same and benzophenone 4,4'-dicarboxylic acid, said mixture having been obtained as a result of the nitric acid oxidation of ditolylethane, which comprises contacting said mixture with at least twice the weight thereof of a mixture containing methanol and acetone at a temperature of about 40° to about 300° C. and thereafter removing solid benzophenone 4,4'-dicarboxylic acid from the resulting mixture.

7. A process for separating benzophenone 2,4'-dicarboxylic acid from a mixture containing the same and benzophenone 4,4'-dicarboxylic acid which comprises contacting said mixture with at least twice the weight thereof of a mixture containing methanol and acetone at a temperature of about 40° to about 300° C. and thereafter removing solid benzophenone 4,4'-dicarboxylic acid from the resulting mixture.

8. A process for separating benzophenone 2,4'-dicarboxylic acid from a mixture containing the same and benzophenone 4,4'-dicarboxylic acid which comprises contacting said mixture with at least twice the weight thereof of a mixture containing methanol and acetone wherein the molar ratio of said methanol is from about 10:1 to about 1:10 at a temperature of about 40° to about 300° C. and thereafter removing solid benzophenone 4,4'-dicarboxylic acid from the resulting mixture.

References Cited

UNITED STATES PATENTS 3,197,499   7/1965   McCracken et al. ____ 260—517

LORRAINE A. WEINBERGER, *Primary Examiner.*

K. I. ROSE, M. BERGER, *Assistant Examiners.*